United States Patent

Craven

[11] 4,118,436
[45] Oct. 3, 1978

[54] ADHESIVE COMPOSITION

[76] Inventor: James M. Craven, 716 Westcliff Rd., Wilmington, Del. 19803

[21] Appl. No.: 701,747

[22] Filed: Jun. 30, 1976

[51] Int. Cl.² ............ C08L 23/34; C08L 61/20
[52] U.S. Cl. ................... 260/826; 260/827; 260/853; 260/878 R; 428/461
[58] Field of Search ............ 260/826, 878 R, 853, 260/827

[56] References Cited

U.S. PATENT DOCUMENTS

| | | | |
|---|---|---|---|
| 3,066,060 | 11/1962 | Gross | 260/826 |
| 3,847,860 | 11/1974 | Seiler et al. | 260/826 |
| 3,890,407 | 6/1975 | Briggs et al. | 260/878 R |

*Primary Examiner*—Wilbert J. Briggs, Sr.

[57] ABSTRACT

An improved adhesive composition of a chlorosulfonated polyethylene, at least one acrylic monomer, such as methyl methacrylate, butyl methacrylate and the like, an amine aldehyde condensation product and optionally a peroxy catalyst in which the improvement comprises the use of a silane of the formula

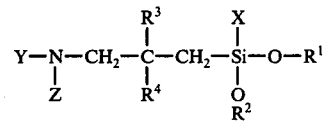

where $R^1$, $-R^2$, $-R^3$ and $-R^4$ are $-H$ or an alkyl group having 1-5 carbon atoms, $-X$ is $-O-R$, $-R$ or $-OH$ where $-R$ is an alkyl group having 1-4 carbon atoms, and Y and Z are $-H$ or a monovalent hydrocarbon-containing radical having 1-20 carbon atoms. The improved adhesive is useful for bonding a wide variety of materials and sets rapidly to form durable bonds that withstand exposure to weathering and high humidity conditions. Usually, the adhesive is applied as a two component system in which a mixture of chlorosulfonated polyethylene and acrylic monomers is applied to one surface to be bonded and a mixture of the amine aldehyde condensation product and the silane is applied to the other surface to be bonded and the two surfaces are brought in abutting relationship to form an adhesive bond.

1 Claim, No Drawings

ADHESIVE COMPOSITION

BACKGROUND OF THE INVENTION

This invention is related to an adhesive composition and in particular to a rapid setting adhesive composition.

Rapid setting adhesives are known in the art as shown by Tobak et al. U.S. Pat. Nos. 3,951,438 issued July 6, 1971, Toback 3,616,040 issued Oct. 26, 1971, Krieble 2,895,950 issued July 21, 1959, Gerhart 2,578,690 issued Dec. 18, 1951. One particularly useful high quality adhesive composition is set forth in Briggs et al. 3,890,407 issued June 17, 1975. One typical use for these adhesives, in particular the Briggs et al. adhesives, is to adhere vinyl or rubber strips to exterior molding or bumpers used on automobiles and trucks. While the Briggs et al. adhesive is excellent and has many uses, an improvement is required to have these adhesives withstand the extremes of weathering and in particular withstand extended periods of exposure to moisture and high humidity. The improved adhesive composition of this invention can withstand the above conditions without reducing strength of an adhesive bond formed therefrom.

SUMMARY OF THE INVENTION

The improved adhesive composition is of a chlorosulfonated polyethylene, at least one acrylic monomer, an amine aldehyde condensation product, and optionally a peroxy catalyst; the improvement used therewith comprises 0.1–10 parts by weight per 100 parts by weight of the amine aldehyde condensate, of a silane of the formula

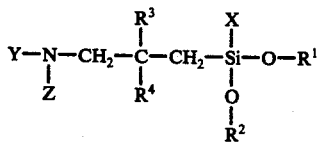

where $-R^1$, $-R^2$, $-R^3$, $-R^4$ are $-H$ or an alkyl group having 1-5 carbon atoms, $-X$ is $-O-R$, $-R$, $-OH$ where R is an alkyl group having 1-4 carbon atoms and Y and Z are $-H$ or a monovalent hydrocarbon-containing radical having 1-20 carbon atoms.

DETAILED DESCRIPTION OF THE INVENTION

Briggs et al. U.S. Pat. No. 3,890,407 discloses the adhesive composition used in this invention and this patent is hereby incorporated by reference. The improved adhesive of this invention comprises the addition of a silane to this adhesive.

The adhesive is of a chlorosulfonated polyethylene, at least one acrylic monomer, an amine aldehyde condensation product and optionally a peroxy catalyst. The improved adhesive uses about 0.1–10 parts by weight per 100 parts by weight of the amine aldehyde condensation product, of a silane. Generally, about 0.5–5 parts by weight per 100 parts by weight of the amine aldehyde condensate, of a silane are used.

The improved adhesive is used as a two component adhesive. A mixture of the chlorosulfonated polyethylene, acrylic monomer or monomers and the optional peroxy catalyst is applied to one side of an article which is to be bonded and a mixture of the amine aldehyde condensate and the silane is applied to one side of a second article to be bonded. The resulting coated sides of the articles are placed in abutting relationship to form an adhesive bond.

Setting times for the two components depends on whether or not a peroxy catalyst is used and if a transition metal is used to increase the reaction rate. Without a transition metal, the setting time is about 5–10 minutes and with the transition metal about 0.5–5 minutes.

The silane is of the following formula:

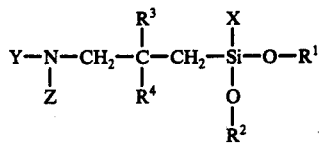

where $-R^1$, $-R^2$, $-R^3$ and $-R^4$ are $-H$ or an alkyl group having 1-5 carbon atoms, $-X$ is $-O-R$, $-R$, $-OH$ where R is an alkyl group having 1-4 carbon atoms and Y and Z are $-H$ or a monovalent hydrocarbon-containing radical having 1-20 carbon atoms.

In silanes which provide excellent adhesion, Y and Z preferably are either $-H$, an alkyl group having 1-20 carbon atoms, a hydroxy alkyl group having 2-20 carbon atoms, an amino alkyl group having 2-20 carbon atoms, an alkyl amino alkyl group having 3-20 carbon atoms, a dialkyl amino alkyl group having 4-20 carbon atoms, an aryl group having 6-20 carbon atoms, an alkyl aryl group having 7-20 carbon atoms, an alkenyl aryl group having 8-20 carbon atoms, a carboalkoxy alkyl group having 4-20 carbon atoms, a carboalkoxy alkyl amino alkyl group having 6-20 carbon atoms, an alkenyl aryl amino alkyl group having 11-20 carbon atoms, an amino alkyl amino alkyl group having 4-20 carbon atoms, an amino alkyl amino alkyl amino alkyl group having 6-20 carbon atoms, an alkoxyl alkyl group having 3-20 carbon atoms, an acyl alkyl group having 4-20 carbon atoms, or an aryl alkyl group having 7-20 carbon atoms.

The following are preferred silanes which provide excellent adhesion:

$NH_2(CH_2)_2NH(CH_2)_3Si(OCH_3)_3$   N-2-aminoethyl-3-aminopropyltrimethoxysilane.

$NH_2(CH_2)_3Si(OC_2H_5)_3$ 3-aminopropyltriethoxysilane $NH_2CH_2CH_2CH_2Si(OCH_3)_3$ 3-aminopropyltrimethoxysilane.

$(HO\ CH_2CH_2)_2N\ CH_2CH_2CH_2Si(OC_2H_5)_3$ Bis(2-hydroxyethyl)aminopropyltriethoxysilane.

$CH_3NH\ CH_2CH_2CH_2Si(OCH_3)_3$ N-Methylaminopropyltrimethoxysilane.

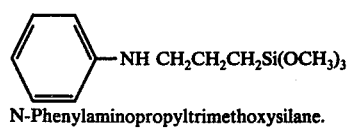

N-Phenylaminopropyltrimethoxysilane.

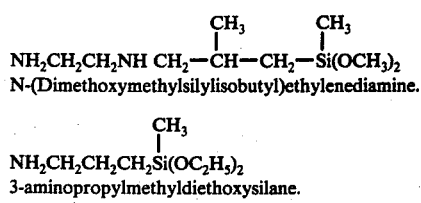

N-(Dimethoxymethylsilylisobutyl)ethylenediamine.

$NH_2CH_2CH_2CH_2Si(OC_2H_5)_2$ with $CH_3$ substituent
3-aminopropylmethyldiethoxysilane.

NH₂CH₂CH₂NH CH₂CH₂NH CH₂CH₂CH₂Si(OCH₃)₃
Trimethoxysilylpropyldiethylenetriamine.

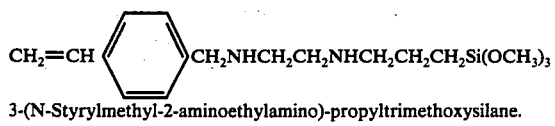
3-(N-Styrylmethyl-2-aminoethylamino)-propyltrimethoxysilane.

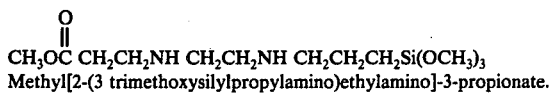
Methyl[2-(3 trimethoxysilylpropylamino)ethylamino]-3-propionate.

Two silanes of the above group which are particularly preferred are N-2-aminoethyl-3-aminopropyltrimethoxy silane and 3-aminopropyltriethoxysilane.

Adhesives prepared with these silanes form bonds which have excellent resistance to weathering, moisture and high humidity conditions.

The silane can be added directly to the amine aldehyde condensate. A precipitate may result which can be filtered from the resulting mixture. It is preferred to dissolve the silane in a solvent such as an alcohol or a ketone and then add the resulting solution to the amine aldehyde condensate. Typical solvents that can be used are acetone, methyl ethyl ketone, methyl isobutyl ketone, methanol, ethanol, n-propanol, isopropanol, n-butanol, isobutanol, tertiary-butanol and the like.

One preferred technique for adding the silane to the amine aldehyde condensate is to dissolve the silane in one of the above solvents and then add a small amount of water. Generally, enough water is added to hydrolyze the alkoxy groups on the silane to hydroxy groups. The resulting mixture is then added to the amine aldehyde condensate. A volatile alcohol such as methanol, ethanol or isopropanol is preferred for this technique.

The chlorosulfonated polyethylene used in the improved adhesive can be prepared in a manner well known to those skilled in the art by reaction of linear or branched polyethylene with sulfonyl chloride, or with sulfur dioxide and chlorine. Chlorosulfonated polyethylene is also available commercially, for example, under the trade name of Hypalon ®. The chlorosulfonated polyethylene may also be a chlorosulfonated copolymer of ethylene with small proportions of propylene or other olefins.

The chlorosulfonated polyethylene should contain about 25-70% by weight of chlorine and about 3-160 milliequivalents sulfonyl chloride per 100 grams of polymer. The polyethylene from which the chlorosulfonated polyethylene is prepared has a melt index of about 4-500. The resulting chlorosulfonated polyethylene has a Mooney viscosity of 10-80 measured at 100° C. according to ASTM D-1646.

The acrylic monomers used in the improved adhesive are, for example, methyl methacrylate, ethyl methacrylate, acrylonitrile, methacrylonitrile, methyl acrylate, ethyl acrylate, butyl methacrylate, cyclohexyl methacrylate, hexyl methacrylate, 2-ethylhexyl methacrylate, lauryl methacrylate, butyl acrylate, cyclohexyl acrylate, hexyl acrylate, 2-ethylhexyl acrylate, lauryl acrylate, methacrylic acid, acrylic acid, glycidyl methacrylate, ethylene glycol and higher-glycol acrylates and methacrylates, 1,3-butylene dimethacrylate or other dimethacrylates or mixtures thereof.

Relative proportions of chlorosulfonated polyethylene and polymerizable acrylic monomers can vary within a rather broad range. In the case of acrylic monomers, the practical range is from about 25 to 2,000 parts by weight of the monomer per 100 parts by weight of chlorosulfonated polyethylene. For most uses, the range is 50–500 parts by weight of the acrylic monomers per 100 parts of the polymer.

Optionally, a peroxy catalyst is used in the improved adhesive. The peroxy catalyst is an organic peroxide or hydroperoxide. One typical peroxy catalyst is cumeme hydroperoxide. This peroxy catalyst is usually mixed with the chlorosulfonated polyethylene/acrylic monomer mixture shortly before the improved adhesive is used.

The amine aldehyde condensation product is the condensation product of an aliphatic aldehyde with an aliphatic or an aromatic amine.

Typical aldehydes include, for example, acetaldehyde, butyraldehyde, propionaldehyde, cyclopentanal, hexanal, cyclohexanal, hydrocinnamaldehydes, heptanal, decanal, and dodecanal. Typical amines include, for example, ethylamine, butylamine, pentylamine, cyclopentylamine, hexylamine, cyclohexylamine, octylamine, decylamine, dodecylamine, hexadecylamine, octadecylamine, aniline, tolylamines, and xylylamines. In both the aldehyde and the amine series, various position isomers are possible. One particularly useful condensation product is the condensation product of aniline and butyraldehyde, sold as 808 ® Accelerator.

Transition metals can be used in the improved adhesive to increase the reaction rate. Generally, a salt or chelate of a transition metal is used, such as cobalt, nickel, manganese, or iron naphthenate, copper octoate, iron hexoate, or iron propionate. Preferred are copper compounds such as copper naphthenate, copper acetoacetate, or copper octoate. The transition metal is usually added to a mixture of chlorosulfonated polyethylene and acrylic monomers, but can also be added to the amine-aldehyde condensate.

The following concentrations of constituents are used in the improved adhesive composition:

optionally up to 10 percent by weight of the adhesive of a peroxy catalyst, 0.05-3 percent is preferred for most uses;

up to 20 percent by weight of the adhesive of an amine aldehyde condensation product, 1–8 percent is preferred;

up to about 200 parts of the transition metal per million of adhesive (on a weight basis), 10–200 parts per million is preferred.

The improved adhesive composition has several advantages. The improved adhesive can be used at room temperature since heat is not required either for applying or curing the adhesive. The adhesive can be used on porous surfaces, unlike some prior art adhesives which require the absence of air and thus cannot be used on surfaces containing air in their pores. The resulting bonds can be flexible or rigid depending on the type and amount of acrylic monomer and chlorosulfonated polyethylene used. Also, the compositions often do not require a careful surface preparation but can be used, for example, on oily steel. Generally, clean surfaces such as sandblasted, ground, abraded, etched or solvent washed are preferred to form high strength adhesive bonds.

Substrates which can be bonded by the compositions of this invention include ordinary steel, aluminum, copper, brass, polymeric materials, polyesters, polyamides, polyurethanes, polyvinyl chloride, etc., wood, prepainted surfaces, glass and paper and the like. The improved adhesive has particularly advantages in forming adhesive bonds with chromium-plated metals, anodized aluminum, glass and ceramics. These aforementioned materials are very difficult to bond. With these latter materials, it is preferred to apply the mixture of amine aldehyde condensation product and silane to the surface of the material that is difficult to bond and apply the chlorosulfonated polyethylene/acrylic monomer mixture to a surface of an object that is to be bonded thereto.

This invention is illustrated by the following examples wherein all parts, proportions, and percentages are by weight unless otherwise indicated.

EXAMPLE 1

Accelerator solution A is prepared by blending together the following constituents:

| Portion 1 | Parts by Weight |
|---|---|
| Isopropyl alcohol | 100 |
| Silane of the formula $NH_2-(CH_2)_2-NH-(CH_2)_3-Si(OCH_3)_3$ | 1.3 |
| Portion 2 | |
| Water | 0.63 |
| Portion 3 | |
| Condensation product of aniline and butyraldehyde (808 ® Accelerator) | 100 |
| TOTAL | 201.93 |

Portion 1 is mixed together, then portion 2 is mixed in and allowed to stand at room temperature for 16 hours. Then portion 3 is mixed in.

An adhesive composition is prepared by blending the following constituents:

| | Parts by Weight |
|---|---|
| Hypalon ® 20-chlorosulfonated polyethylene having a Mooney viscosity of 30 at 100° C, a 29% chlorine content and a 1.4% sulfur content | 28.5 |
| Butyl methacrylate monomer | 56.2 |
| Methacrylic acid monomer | 14.3 |
| 1,3-Butylene dimethacrylate monomer | 1.0 |
| TOTAL | 100.0 |

The above constituents are mixed together and then a sufficient amount of copper naphthenate is added to provide 5 parts of copper per million parts adhesive.

A test is conducted in which a red vinyl strip 9/16 inch wide and 3/16 inch thick is bonded to aluminum automobile side molding strip. The vinyl strip is sanded and in one test the above prepared accelerator A solution is applied to the vinyl strip and dried and in another test accelerator A solution is applied to the aluminum side molding and dried and the adhesive is applied to an opposing part. In both tests the vinyl strip and molding are brought into abutting relationship and a bond is formed. A black vinyl strip ¼ inch wide and ⅛ inch thick is similarly bonded to an aluminum automobile side molding strip.

The same tests are conducted as above except an accelerator B is used which is only a condensation product of aniline and butyraldehyde.

The peel strength of the adhesive bond at 90° is measured with a force gauge (Chatillon Model DP-50) after 1 day exposure at room temperature. The bonds are exposed to 100% Relative Humidity at a temperature of 100° F. (38° C.) and the peel strength is measured after 8 and 14 days. After the 14 day exposure the bonds are held at room temperature conditions for 37 days and the peel strength is measured.

The results of the test are in Table I.

The data in Table I show that when accelerator solution A which contains a silane is applied to the aluminum molding, it forms bonds with superior peel strengths initially and after exposure to high humidity in comparison to the bonds similarly prepared and formed with accelerator B which does not contain silane.

TABLE I

| | | | Bond Strength Evaluation of Anodized Aluminum to Vinyl | | | |
|---|---|---|---|---|---|---|
| | | | Bond Strength (pounds per square inch) 90° Peel | | | 14 days 100% R.H. |
| Vinyl | Accelerator | | | 8 days 100% R.H. | 14 days 100% R.H. | 100° F + 37 days |
| Color | Type | Applied To | 1 Day Room Temp. | 100° F | 100° F | room temperature |
| Red | A | Aluminum | 42 | 29 | 32 | 38 |
| Red | A | Vinyl | 26 | 20 | 17 | 21 |
| Red | B | Aluminum | 26 | 21 | 10 | 19 |
| Red | B | Vinyl | 22 | 19 | 14 | 21 |
| Black | A | Aluminum | 37 | 27 | 27 | 28 |
| Black | A | Vinyl | 23 | 24 | 28 | 34 |
| Black | B | Aluminum | 22 | 15 | 19 | 22 |
| Black | B | Vinyl | 22 | 27 | 31 | 40 |

EXAMPLE 2

The same adhesive composition is used as in Example 1 except the adhesive composition does not contain copper naphthenate but contains 0.5% by weight based on the weight of the adhesive composition of cumene hydroperoxide. This adhesive composition is used to bond chrome strips to steel strips. The steel is washed with acetone, sanded with #120 paper, treated with a 1% aqueous solution of the silane described in Example 1, dried for ½ hour, washed with acetone and dried at room temperature. The chrome strip is rinsed with acetone, washed with hot water for 2 minutes, rinsed with acetone and dried at room temperature.

Accelerators described in Table II are applied to the chrome strips and dried. The above adhesive is applied to the steel strips and then the steel strip and chrome strip are placed in an abutting relationship to form an adhesive bond. The T-peel strength of the bond is measured on an Instron at a crosshead speed of 5 inches/minute after 1 day at room temperature, 15 days at room temperature, 8 days at 100% Relative Humidity at 100° F. (38° C.) and 15 days at the same conditions. The results of the test are in Table II.

The test data in Table II shows that the bonds formed with the accelerator solutions containing a silane have superior strength initially and after exposure to high humidity, in comparison to bonds prepared without a silane in the accelerator solution.

TABLE II

Bond Strength Evaluation of Chrome to Steel

| 808® Accelerator (described in Example 1) | Accelerator Isopropyl Alcohol | Silane (described in Example 1) | Water | Bond Strength (pounds per square inch) T-Peel | | | |
|---|---|---|---|---|---|---|---|
| | | | | 1 day room temperature | 15 days room temperature | 8 days 100% R.H. 100° F | 15 days 100% R.H. 100° F |
| 100 | — | — | — | 7.1 | 5.1 | 4.0 | 3.5 |
| 100 | 200 | 1.3 | — | 10.3 | 10.8 | 7.4 | 6.5 |
| 100 | 200 | 1.3 | 0.6 | 14.3 | 11.6 | 6.1 | 6.1 |
| 100 | 200 | 2.5 | 1.3 | 25.7 | 21.0 | 15.7 | 10.5 |

EXAMPLE 3

An adhesive composition of Example 1 is prepared except copper naphthenate is not added. Table III shows different adhesives which are prepared in which some contain 5 parts per million (ppm) copper provided by addition of copper naphthenate and some contain 0.5% cumene hydroperoxide or both constituents. These adhesives are used in combination with different accelerators as set forth in Table III.

The adhesive is applied to a 1⅜ inch wide by ½ inch thick vinyl strip. A chromium-plated bumper segment is washed with acetone, hot running water, and then with acetone and dried. The cleaned bumper segment is optionally aged at room temperature for a given period of time as shown in Table III. The accelerator is applied to the bumper segment and dried. The coated vinyl strip is then contacted with the coated bumper segment to form an adhesive bond. The bonds may then be exposed to a hot/cold cycle of 7 hours at −29° C. and 17 hours at 80° C. or exposed to 100% Relative Humidity at 38° C. The bond peel strength is measured as in Example 1. The results of these tests are in Table III.

TABLE III

| Adhesive | | Accelerator (parts by weight) | | | | | | | Bond Exposure | | |
|---|---|---|---|---|---|---|---|---|---|---|---|
| Copper (ppm) | Cumene Hydroperoxide (%) | 808 Accelerator | iso propanol | Silane (Example 1) | Water | Copper | Vinyl Sanded | Chrome Aged | Hot/Cold | 100%R.H. 28° C. | Average Peel Force (pounds) |
| — | 0.5 | 100 | 200 | 2.5 | 1.3 | — | No | No | 6 cycles | 4 days | >49 |
| 5 | 0.5 | 100 | 200 | 2 | 1 | — | No | No | 6 cycles | 4 dyas | 23 |
| 5 | 0.5 | 100 | 200 | 2 | 1 | — | Yes | 1 Hr | 6 cycles | — | >46 |
| 5 | 0.5 | 100 | 200 | 2 | 1 | — | Yes | 1 Hr | 6 cycles | 4 days | 27 |
| 5 | 0.5 | 100 | 200 | 2 | 1 | — | Yes | 24 Hrs | 6 cycles | — | 34 |
| 5 | 0.5 | 100 | 200 | 2 | 1 | — | Yes | 24 Hrs | 6 cycles | 4 days | 26 |
| 5 | 0.5 | 100 | 200 | 2 | 1 | — | No | 1 Hr | — | 20 days | 23 |
| 5 | 0.5 | 100 | 200 | 2 | 1 | — | Yes | 1 Hr | — | 20 days | 22 |
| 5 | 0.5 | 100 | 200 | 2 | 1 | — | Yes | 7 Hrs | — | 20 days | 27 |
| 5 | — | 100 | 200 | 2 | 1 | — | No | No | — | 7 days | 29 |
| 5 | — | 100 | 200 | 2 | 1 | — | No | 1 Mo | — | 7 days | 29 |
| 5 | 0.5 | 100 | 200 | 2.5 | 1.3 | — | Yes | No | — | 14 days | 36 |
| — | 0.5 | 100 | 200 | 2.5 | 1.3 | 0.01 | Yes | No | — | 14 days | 43 |

I claim:

1. An improved adhesive composition of:
   (a) a chlorosulfonated polyethylene;
   (b) methacrylic acid;
   (c) an acrylic monomer selected from the group of butyl methacrylate, methyl methacrylate, 1,3 butylene dimethacrylate, or mixtures of these;
   (d) the reaction product of butyraldehyde and aniline;
   (e) cumene hydroperoxide; and
   (f) 10–200 parts by weight of copper per million parts by weight of adhesive; the improvement used therewith comprises: 0.1–10 parts by weight, per 100 parts by weight of the reaction product, of a silane of the formula $$NH_2(CH_2)_3-Si(OC_2H_5)_3$$

or $$NH_2(CH_2)_2-NH-(CH_2)_3-Si(OCH_3)_3.$$

* * * * *